(12) United States Patent
Kitamura et al.

(10) Patent No.: US 11,079,859 B2
(45) Date of Patent: Aug. 3, 2021

(54) ELECTRONIC APPARATUS HAVING A POINT STICK IN A KEYBOARD

(71) Applicant: LENOVO (SINGAPORE) PTE. LTD., Singapore (SG)

(72) Inventors: Masahiro Kitamura, Kanagawa (JP); Satoshi Douzono, Kanagawa (JP); Kazutoshi Sugisawa, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/743,741

(22) Filed: Jan. 15, 2020

(65) Prior Publication Data
US 2020/0225769 A1 Jul. 16, 2020

(30) Foreign Application Priority Data
Jan. 15, 2019 (JP) .............................. JP2019-04111

(51) Int. Cl.
| G06F 3/03 | (2006.01) |
| G06F 3/0338 | (2013.01) |
| G06F 1/16 | (2006.01) |
| G06F 3/02 | (2006.01) |

(52) U.S. Cl.
CPC ............ *G06F 3/0338* (2013.01); *G06F 1/169* (2013.01); *G06F 3/0213* (2013.01)

(58) Field of Classification Search
CPC ...... G06F 1/1616; G06F 1/169; G06F 3/0213; G06F 3/0338
See application file for complete search history.

(56) References Cited

U.S. PATENT DOCUMENTS

| 5,231,386 A * | 7/1993 | Brandenburg ......... G05G 9/047 200/5 R |
| 5,407,285 A * | 4/1995 | Franz .................... G05G 9/047 200/6 A |
| 5,541,622 A * | 7/1996 | Engle .................... G05G 9/047 345/161 |
| 2003/0016209 A1* | 1/2003 | Narusawa ............. G06F 3/0213 345/168 |
| 2004/0201606 A1* | 10/2004 | Ito ........................ G06F 3/0213 715/702 |

(Continued)

FOREIGN PATENT DOCUMENTS

| JP | 06-017152 U | 3/1994 |
| JP | 20120208870 A | 10/2012 |

(Continued)

*Primary Examiner* — Liliana Cerullo
(74) *Attorney, Agent, or Firm* — Antony P. Ng; Russell Ng PLLC

(57) ABSTRACT

An electronic apparatus is disclosed. The electronic apparatus includes a keyboard having a support plate, a set of keytops configured to be supported on an upper face side of the support plate to be vertically movable, a pointing stick configured to be installed on the upper face side of the support plate and to be surrounded by the set of keytops, a bracket member installed on the lower face side of the support plate and to support the pointing stick, and a screw, which is located in a space between the set of keytops, secures the bracket member to the support plate, in which a head or a tip of the screw projects more upward than the upper face of the support plate.

11 Claims, 9 Drawing Sheets

LEFT ◄──► RIGHT

(56) References Cited

U.S. PATENT DOCUMENTS

| | | | |
|---|---|---|---|
| 2014/0225830 A1* | 8/2014 | Tamura | G06F 3/0338 345/157 |
| 2016/0091985 A1* | 3/2016 | Mori | G06F 3/0213 345/161 |
| 2016/0224131 A1* | 8/2016 | Nakamura | G06F 3/0354 |
| 2018/0210513 A1* | 7/2018 | Lin | G06F 1/1681 |
| 2020/0004296 A1* | 1/2020 | Lee | G06F 1/1652 |

FOREIGN PATENT DOCUMENTS

| | | |
|---|---|---|
| JP | 20140153968 A | 8/2014 |
| JP | 20160143306 A | 8/2016 |
| JP | 2018-013974 A | 1/2018 |

* cited by examiner

ELECTRONIC APPARATUS HAVING A POINT STICK IN A KEYBOARD

PRIORITY CLAIM

The present application claims benefit of priority under 35 U.S.C. §§ 120, 365 to the previously filed Japanese Patent Application No. JP2019-04111 with a priority date of Jan. 15, 2019, which is incorporated by reference herein.

TECHNICAL FIELD

The present invention relates to electronic apparatuses in general, and in particular to an electronic apparatus having a keyboard device.

BACKGROUND

Some electronic apparatuses, such as laptop personal computers, include a keyboard device equipped with a pointing stick so as to improve convenience of input operations. The pointing stick is supported by a bracket member that is arranged on the lower face side of a support plate that serves as an attachment plate onto which respective keytops are attached. With the above-mentioned configuration, the pointing stick is vertically movable, and the bracket member is also vertically movable. However, in a configuration that the pointing stick does not move vertically, the bracket member is fixed to a base plate by screw fastening.

Incidentally, when a screw that is used to fix the bracket member to the support plate projects more upward than an upper face of the support plate and interferes with the keytops, it is difficult to secure a sufficient keystroke. In addition, when the screw projects more downward than the lower face of the support plate, there is a concern that the screw may interfere with a motherboard that is arranged under the keyboard device. The problem of interference of the screw with the keytops, the motherboard, etc. can be avoided by thickening the keyboard device to some extent or by securing an installation space for the keyboard largely to some extent. However, the keyboard device is thicker, which interferes with the thinning of a chassis of the electronic apparatus.

Consequently, it would be desirable to provide an improved electronic apparatus having a relatively thin keyboard device that is equipped with a pointing stick.

SUMMARY

In accordance with an embodiment of the present disclosure, an electronic apparatus includes a keyboard having a support plate, a set of keytops configured to be supported on an upper face side of the support plate to be vertically movable, a pointing stick configured to be installed on the upper face side of the support plate and to be surrounded by the set of keytops, a bracket member installed on the lower face side of the support plate and to support the pointing stick, and a screw, which is located in a space between the set of keytops, secures the bracket member to the support plate, in which a head or a tip of the screw projects more upward than the upper face of the support plate.

According to the above-mentioned configuration, the screw that is used to fix the bracket member that supports the pointing stick to the support plate is arranged at a position where the head or the tip of the screw projects more upward than the upper face of the support plate. As a result, it becomes possible for the screw to secure an engagement length that makes sure fixing of the screw into an attachment hole possible at a position where the head or the tip of the screw does not project downward from the lower face of the bracket member. Therefore, it becomes possible to prevent the head or the tip of the screw from projecting downward from the lower face of the bracket member and interfering with other components such as a substrate and so forth which are arranged under the bracket member, which makes the thinning of the keyboard device more possible. Moreover, since the screw is prevented also from interfering with the keytops, it becomes possible to promote thinning of the whole keyboard device while sufficiently securing the keystroke of the keytops.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
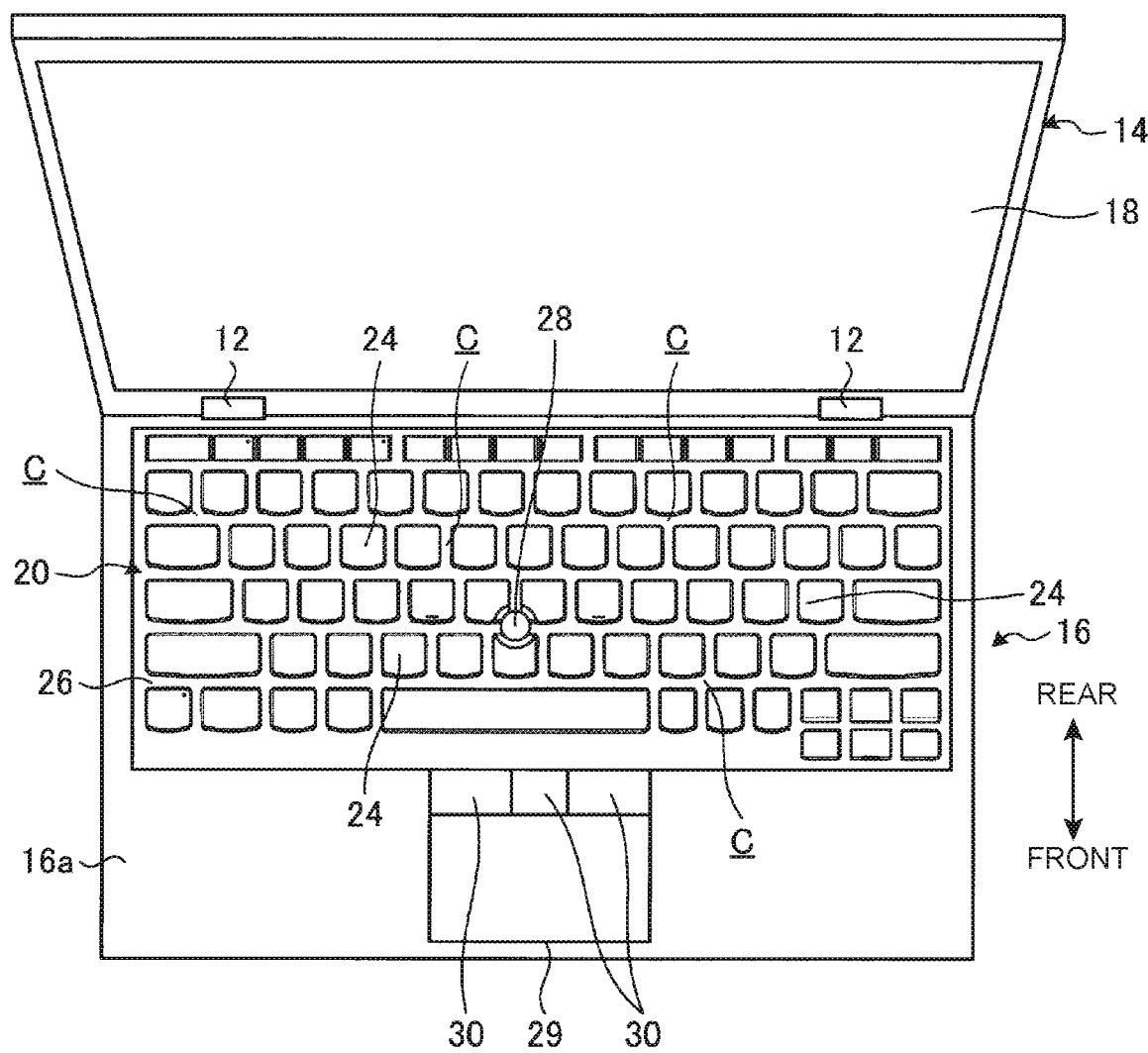
FIG. 1 is a plan view of an electronic apparatus, according to one embodiment.

FIG. 1 is a plan view illustrating one example of an electronic apparatus 10 according to one embodiment of the present invention. As shown, the electronic apparatus 10 is a laptop PC having a display chassis 14 coupled to a main body chassis 16 to be rotationally movable via left and right hinges 12.

In the following, the electronic apparatus 10 will be described by calling the front side as "the front" and calling the back side as "the rear" in a direction when viewing from a user who operates a keyboard device 20 while visually recognizing a display 18 with a state where the display chassis 14 is opened separately from the main body chassis 16 to bring the electronic apparatus 10 into a use form as illustrated in FIG. 1 being set as a reference, and then by calling a thickness direction of the main body chassis 16 as a top-bottom direction and calling a width direction of the main body chassis 16 as a left-right direction.

The display chassis 14 is a thin-box-shaped chassis and includes the display 18 which is configured by, for example, a liquid crystal display. The hinges 12 couple together a lower end of the display chassis 14 and a rear end of the main body chassis 16 respectively.

The main body chassis 16 is a thin-box-shaped chassis which is thicker than the display chassis 14. A substrate 22 (see FIG. 5) such as a mother board and so forth, various electronic components such as an arithmetic unit, a memory and so forth to be mounted on the substrate 22, a battery device, a cooling device and so forth are housed in the main body chassis 16.

The keyboard device 20 is installed on an upper face 16a of the main body chassis 16. The keyboard device 20 includes a set of keytops 24 that is arrayed side by side in a front-rear direction and the left-right direction. A space C around each keytop 24 is filled with a frame 26. The keyboard device 20 according to the present embodiment has an isolation type structure that the adjacent keytops 24 are partitioned off by the frame 26 such that the respective keytops 24 are configured to be independent of one another. The frame 26 is a meshed plate in which a plurality of holes into which the respective keytops 24 are to be inserted to be vertically movable is formed. The frame 26 may be either molded integrally with a cover member which forms the upper face 16a of the main body chassis 16 or configured separately from the cover member and then coupled with the cover member.

The keyboard device 20 has a pointing stick 28 almost at the center thereof. The pointing stick 28 is an input device which is used to operate a cursor (a mouse pointer) which is displayed on the display 18 and is operable in place of a mouse.

A touch pad 29 is installed on the front of the keyboard device 20. The touch pad 29 is an input device which is used to operate the cursor (the mouse pointer) which is displayed on the display 18. Three function buttons 30 which function in linkage with a cursor operation by the pointing stick 28 or the touch pad 29 are installed on the rear of the touch pad 29.

Figure 2:
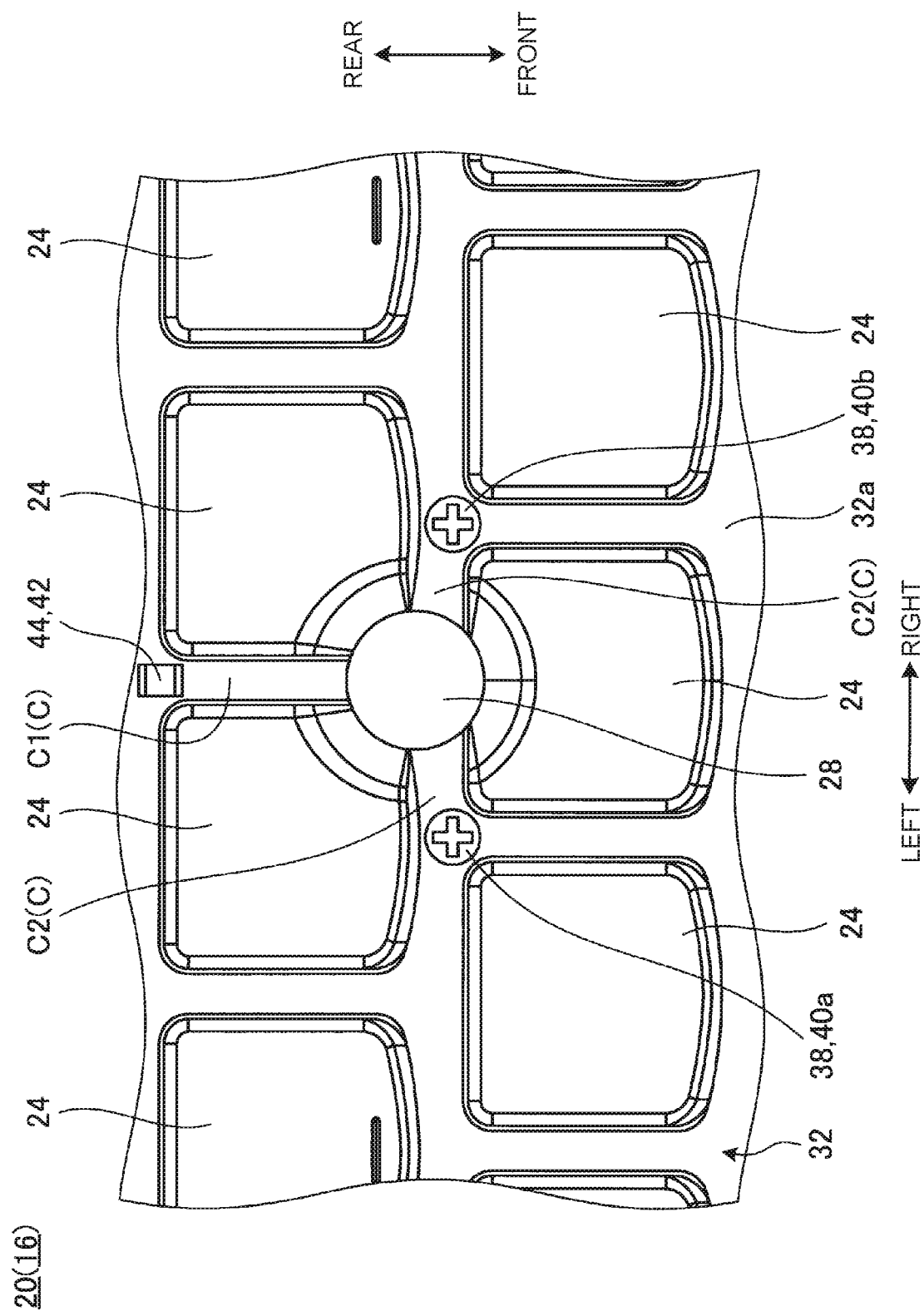
FIG. 2 illustrates a pointing stick of a keyboard device and peripheral parts of the pointing stick.
Figure 3:
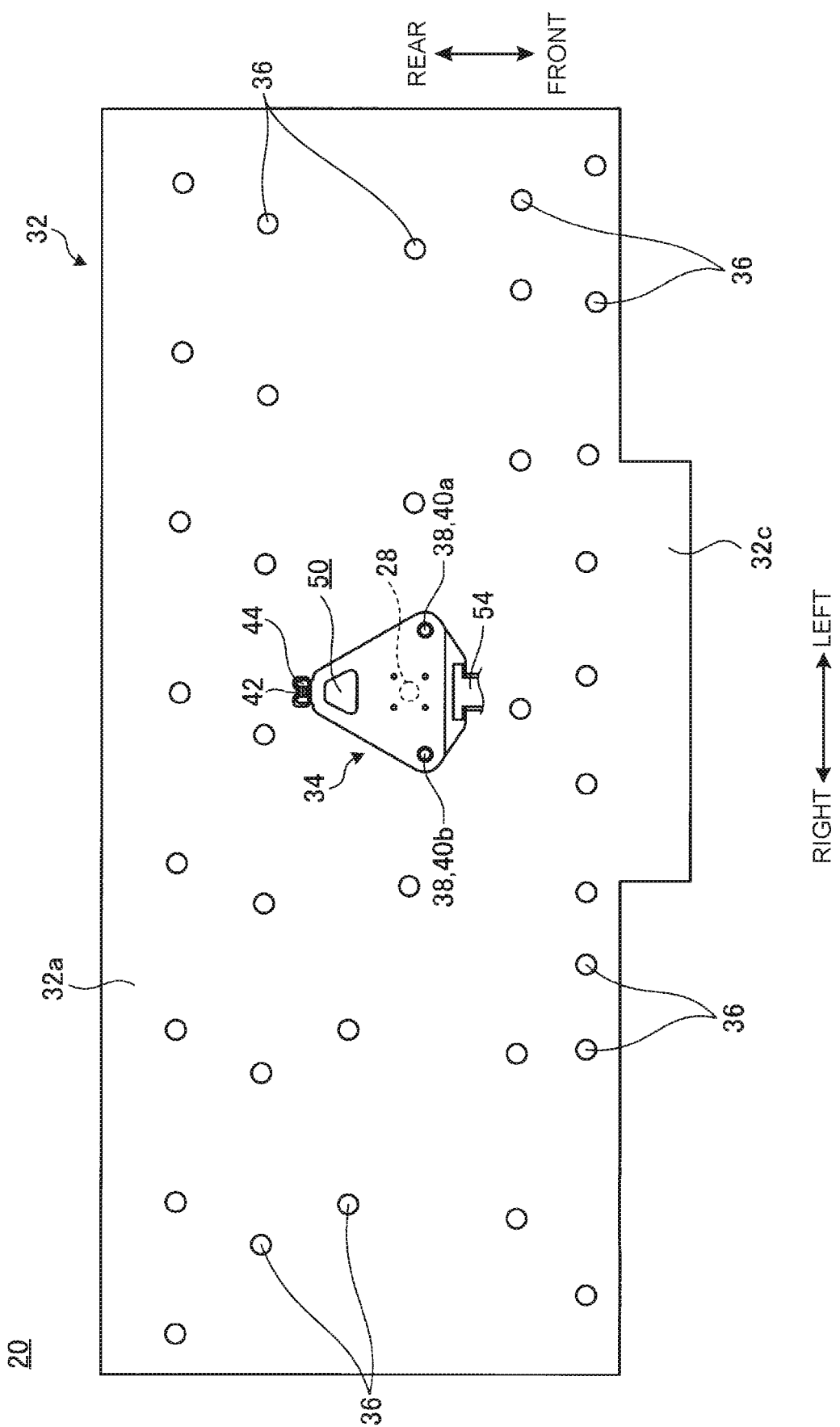
FIG. 3 is a bottom view of the keyboard device.

FIG. 2 is a plan view illustrating one example that the pointing stick 28 of the keyboard device 20 and peripheral parts of the pointing stick 28 are illustrated in an enlarged state and illustration of the frame 26 is omitted. FIG. 3 is a schematic bottom view illustrating one example of the keyboard device 20.

As illustrated in FIG. 2, the pointing stick 28 is a member which is circular in a planar view. The pointing stick 28 is arranged at a position where, in spaces C between the respective keytops 24, a space C1 which is formed between, for example, one pair of the left and right keytops 24 and 24 and extends in the front-rear direction intersects a space C2 which is formed between the front and rear keytops 24 and 24 and extends in the left-right direction. That is, the pointing stick 28 according to the present embodiment is arranged at a position where the spaces C mutually intersect in the form of a T-shape and is arranged at a position where parts of the surrounding three keytops 24 are notched into a circular form.

As illustrated in FIG. 2 and FIG. 3, the keyboard device 20 has a support plate 32 which serves as an attachment plate for the respective keytops 24. The pointing stick 28 is supported on a bracket member 34 which is attached to a lower face 32a of the support plate 32 and projects upward from an upper face 32b of the support plate 32 (see FIG. 5). As illustrated in FIG. 3, the support plate 32 is fixed by screw-fastening to the frame 26 with attachment screws 36 which pass through respective places of the lower face 32a of the support plate 32. In FIG. 3, a reference symbol 32c denotes a bulgy part which is formed by bulging an almost center part of a front edge of the support plate 32 forward and is a part which serves as an attachment plate for the above-described respective function buttons 30.

In the present embodiment, the bracket member 34 is attached to the support plate 32 by using one pair of left and right attachment holes 40a and 40b into which the screws 38 are to be attached and an engagement part 44 which comes into engagement with an engaged part 42 which is formed on the support plate 32.

Figure 4:
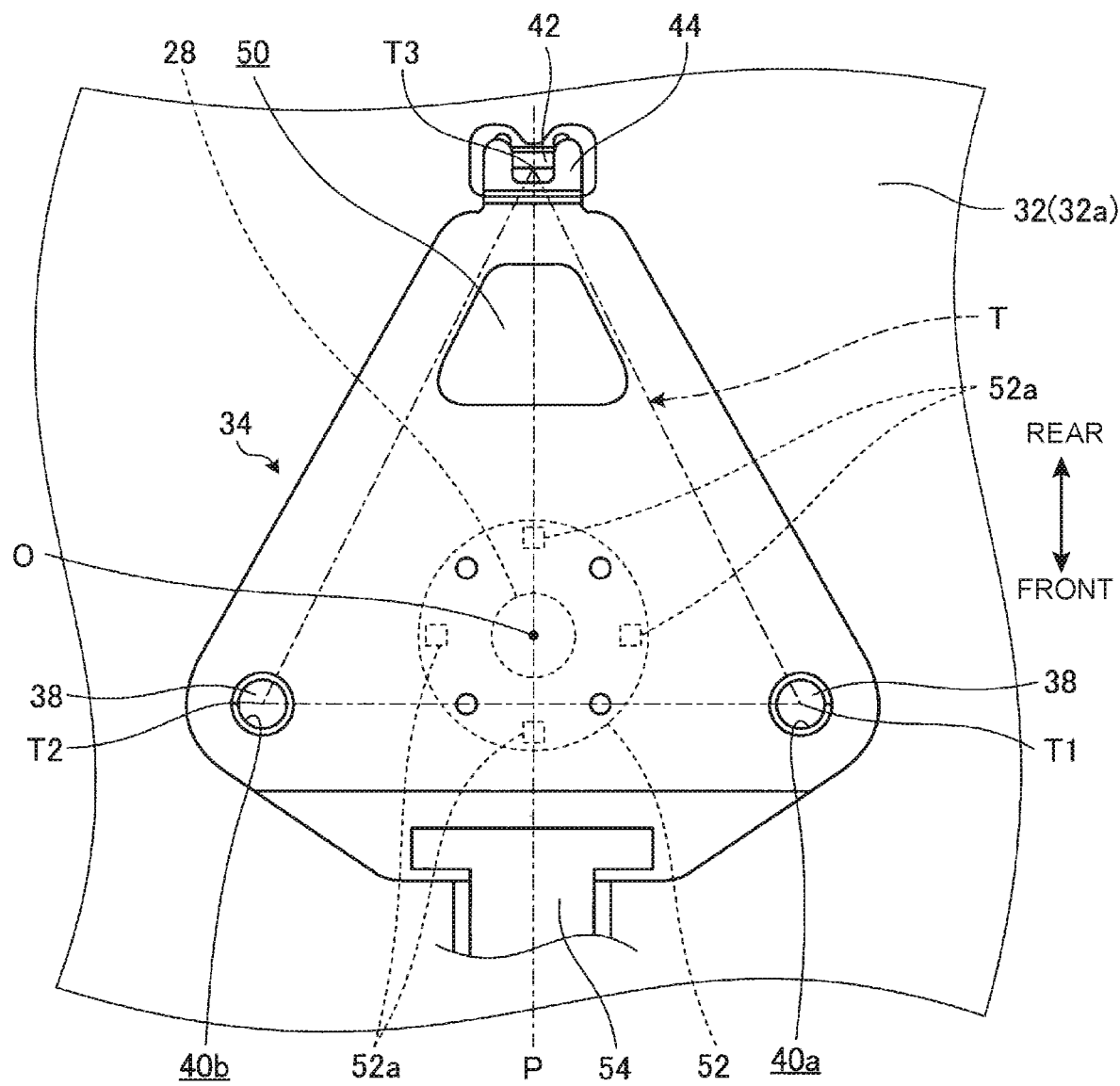
FIG. 4 is a bottom view of a bracket member.
Figure 5:
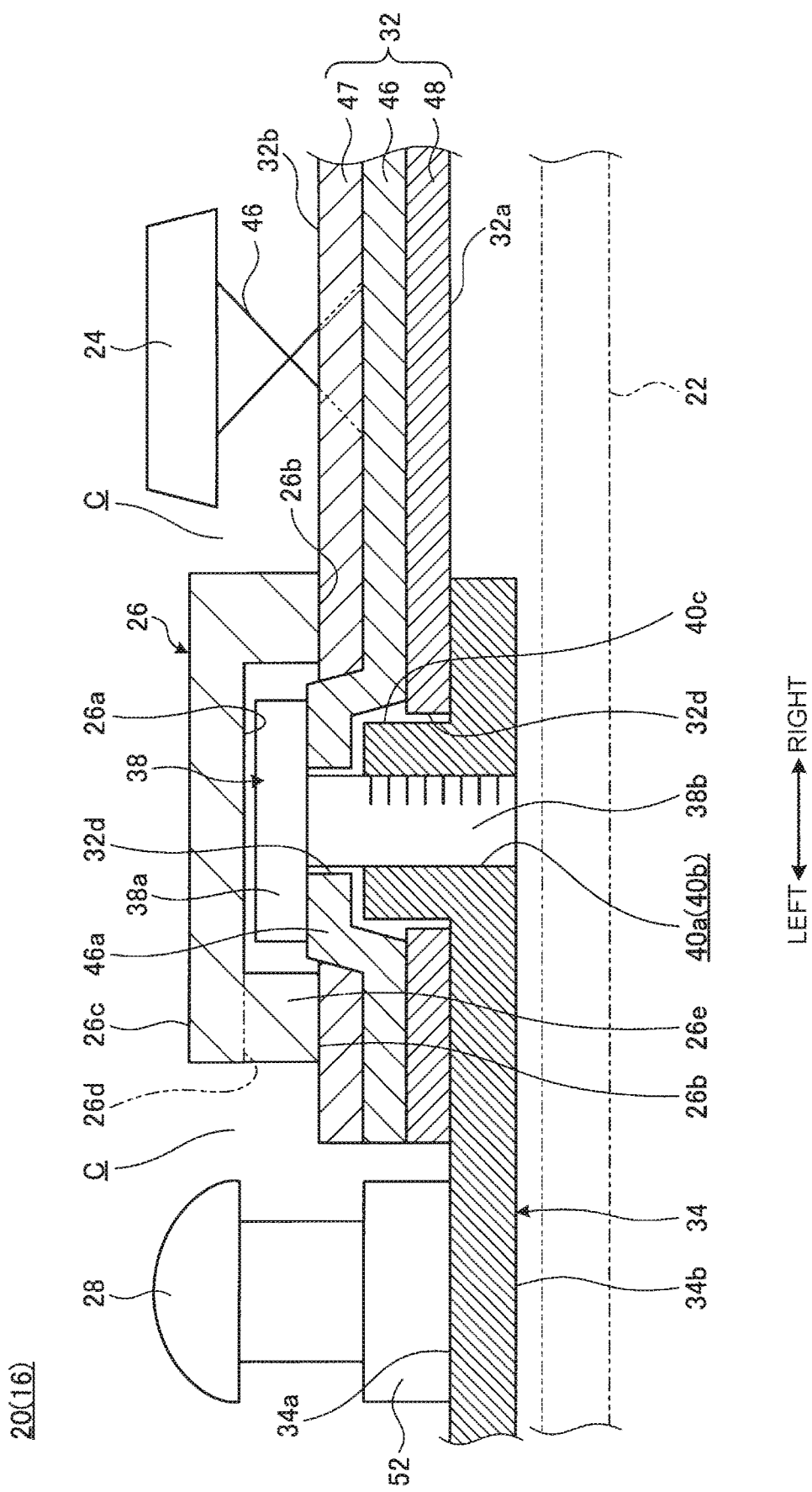
FIG. 5 is an enlarged sectional diagram illustrating a longitudinal section structure of the keyboard device.
Figure 6:
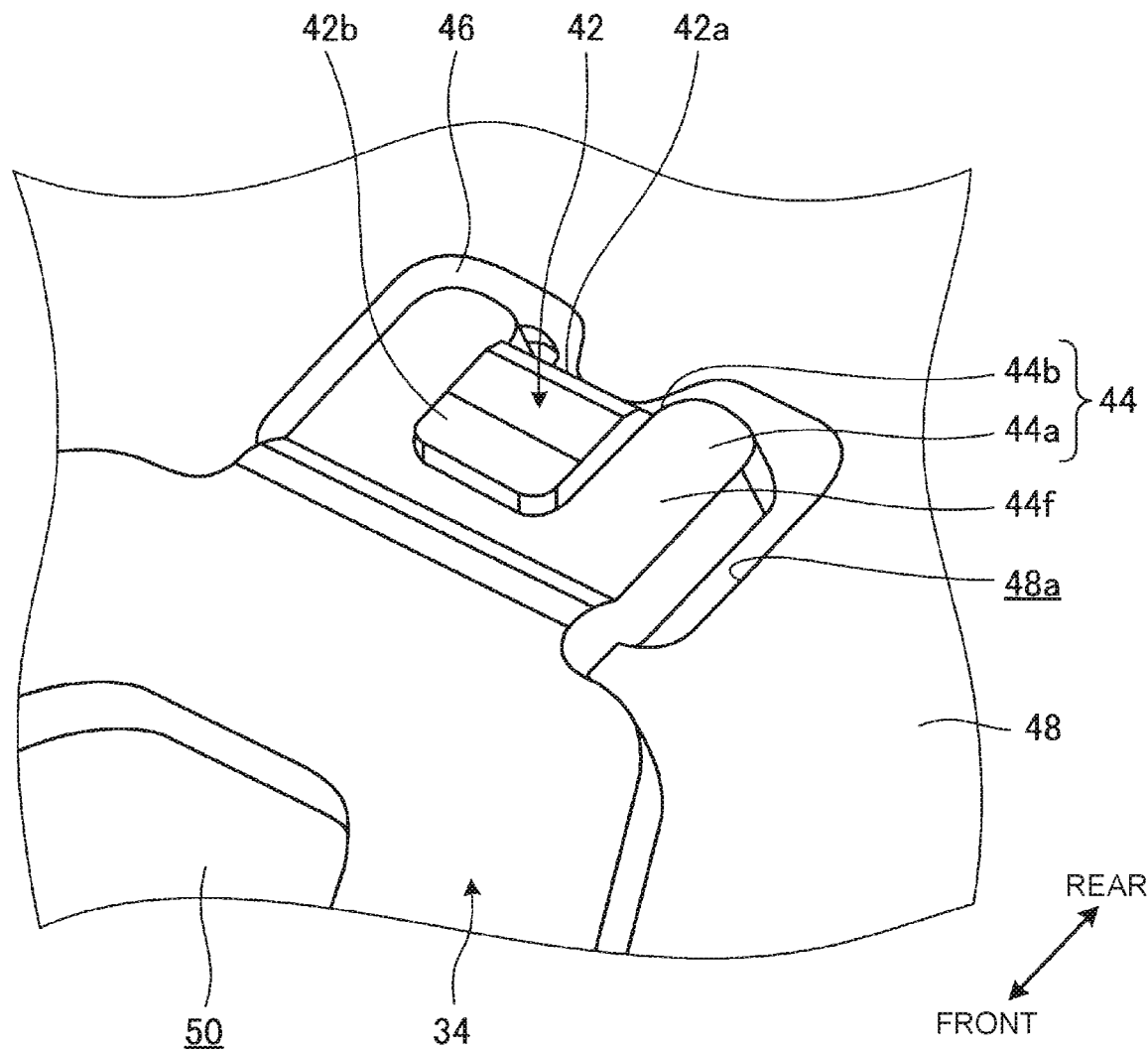
FIG. 6 is a perspective view illustrating an engagement part and an engaged part are illustrated in the enlarged state.
Figure 7A:
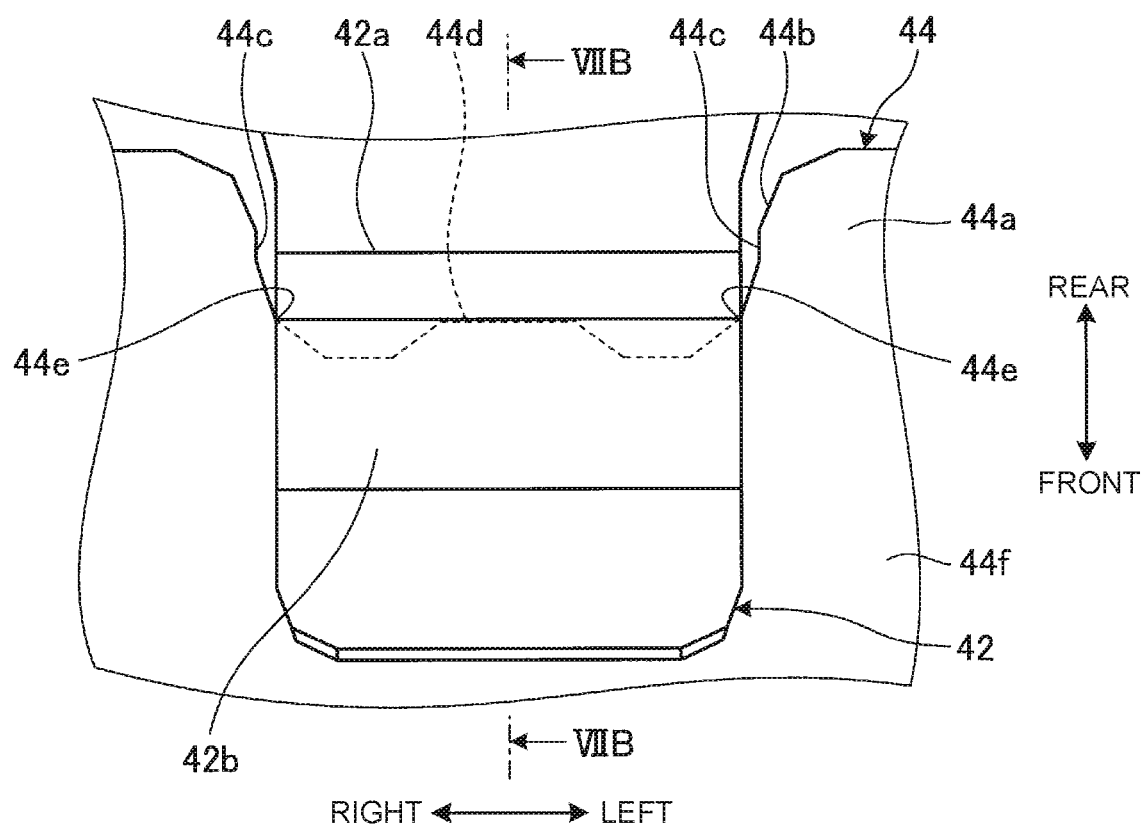
FIG. 7A is a bottom view illustrating the engagement part and the engaged part illustrated in FIG. 6.
Figure 7B:
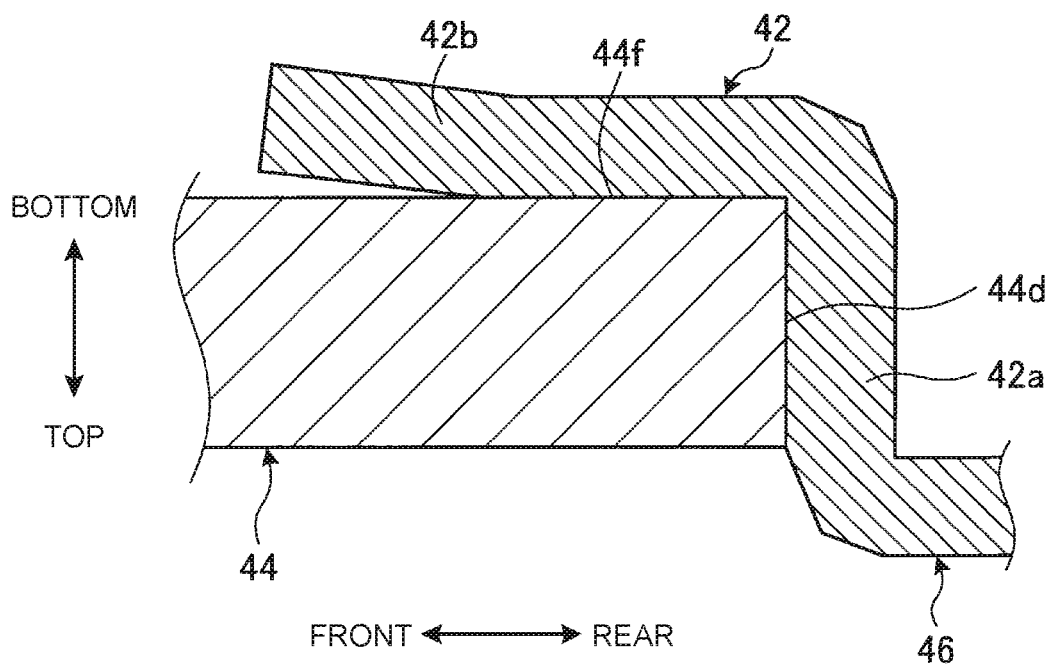
FIG. 7B is a sectional diagram taken along the VIIB-VIIB line in FIG. 7A.

Then, next, a configuration of the bracket member 34 and an attachment structure that the pointing stick 28 is attached to the support plate 32 by using the bracket member 34 will be described. FIG. 4 is a bottom view illustrating one example that the bracket member 34 and peripheral parts of the bracket member in FIG. 3 are illustrated in the enlarged state. FIG. 5 is an essential part enlarged sectional diagram schematically illustrating one example of a longitudinal section structure of the keyboard device 20. FIG. 6 is a perspective view illustrating one example that the engagement part 44 and the engaged part 42 are illustrated in the enlarged state. FIG. 7A is a bottom view illustrating one example of the engagement part 44 and the engaged part 42 illustrated in FIG. 6. FIG. 7B is a sectional diagram taken along the VIIB-VIIB line in FIG. 7A.

As illustrated in FIG. 5, the support plate 32 is a plate having a three-layer structure which is configured by a base plate 46, a membrane sheet 47 which is laminated on an upper face of the base plate 46 and a light guide plate 48 which is laminated on a lower face of the base plate 46. The support plate 32 may have a structure other than the three-layer structure.

The base plate 46 is formed by performing molding such as cut and raise molding, punch molding and so forth on a metal plate such as a thin stainless plate, a thin aluminum plate and so forth. In the support plate 32, the base plate 46 serves as an attachment plate for the keytops 24 and the pointing stick 28 (the bracket member 34). The membrane sheet 47 is a switch sheet having a three-layer structure that a contact is closed, for example, in a case of being depressed. The membrane sheet 47 is configured in such a manner that, in a case where a position where a fixed contact and a movable contact overlap each other is depressed, the fixed contact and the movable contact come into close contact with each other and thereby the contact is closed. The membrane sheet 47 may also have, for example, a structure that a contact switch of the type that a rubber conductive part short-circuits a circuit is used and so forth other than the three-layer structure. The membrane sheet 47 has through-holes in respective places and a guide mechanism 49 is attached onto an upper face of the base plate 46 via some of the through-holes. Each keytop 24 moves vertically under a guide action of the guide mechanism 49 and turns on the switch of the membrane sheet 47 via a rubber doom which is not illustrated in the drawing in a case of moving downward. The membrane sheet 47 may be laminated on the lower face side of the base plate 46. The light guide plate 48 illuminates each keytop 24 from the lower face side by guiding and reflecting light which is emitted from a light source such as an LED element and so forth. The light guide plate 48 may be omitted and a waterproof sheet may be installed in place of the light guide plate 48.

As illustrated in FIG. 4 and FIG. 5, the bracket member 34 is fixed to the lower face 32a side of the support plate 32. The bracket member 34 is made up of a metal plate such as a thin stainless plate, a thin aluminum plate and so forth and has an almost hanging bell shape which is formed to be narrowed in width toward the rear in the planar view. The bracket member 34 has one pair of the attachment holes 40a and 40b, the engagement part 44 and an opening 50.

The attachment holes 40 and 40b are installed on a front-side section of the bracket member 34 at positions which are closer to left and right ends respectively and are arrayed side by side in the left-right direction. The bracket member 34 has a cylindrical part 40c which stands upward from an upper face 34a. The cylindrical part 40c is formed by, for example, burring processing and so forth which is performed from the lower face 34b side toward the upper face 34a side of the bracket member 34. The attachment hole 40a (40b) is formed to pass through the cylindrical part 40c and a female screw with which screwing of a screw (that is, each of two screws) 38 is possible is formed in an inner circumferential surface of the attachment hole 40a (40b).

The engagement part 44 is installed on a tapered rear edge of the bracket member 34. As illustrated in FIG. 4, and FIG. 6 to FIG. 7B, the engagement part 44 has a plate piece portion 44a which projects rearward and an engagement dented portion 44b which is formed by denting a rear end face of the plate piece portion 44a forward. As illustrated in FIG. 7A, the engagement dented portion 44b is made up of left and right side walls 44c and 44c and a projection 44d which is formed between the side walls 44c and 44c. The respective side walls 44c and 44c are end faces whose inclination angles stepwise change in directions that the side walls 44c and 44c gradually come closer to each other toward the back side of the engagement dented portion 44b. Accordingly, in the engagement dented portion 44b, a width between the left and right side walls 44c and 44c is gradually narrowed toward the back side. The projection 44d is a trapezoidal projected portion which is formed by projecting left and right central portions of an end face of the bottom of the engagement dented portion 44b toward the opening side (the rear).

As illustrated in FIG. 4, centers of the attachment holes 40a and 40b are referred to as a first vertex T1 and a second vertex T2 respectively and a left-right direction central position of a tip face of the projection 44d of the engagement part 44 is referred to as a third vertex T3. Then, it is possible to form a triangle T (see a one-point chain line in FIG. 4) by connecting the respective vertexes T1 to T3 with line segments. In the present embodiment, the triangle T is in the form of an isosceles triangle that a side which connects the first vertex T1 and the third vertex T3 and a side which connects the second vertex T2 and the third vertex T3 have the same length. That is, the triangle T forms the isosceles triangle that the first vertex T1 and the second vertex T2 are arranged side by side in the left-right direction and a side which joins the first vertex T1 and the second vertex T2 is set as the base. Then, a perpendicular line P which runs perpendicularly to the base, passing through the third vertex T3 and a center O of the pointing stick 28.

In addition, the first vertex T1 and the second vertex T2 are arranged more forward than the center O of the pointing stick 28 and the third vertex T3 is arranged more rearward than the center O of the pointing stick 28. That is, the center O of the pointing stick 28 is arranged in an inner region of the triangle T, specifically, at a position where the center O almost matches the center of gravity of the triangle T.

The opening 50 is a hollowed-out hole which is formed at a position which is close to the engagement part 44 of the bracket member 34. In the present embodiment, the opening 50 has a trapezoidal shape which matches a tapered shape of the rear end of the bracket member 34. In the bracket member 34, strength (rigidity) of a rear part where the engagement part 44 is formed is lower than strength of a front part where the attachment holes 40a and 40b are formed owing to formation of the opening 50. Thereby, the opening 50 functions as a stress dispersion structure part where the stress which is applied to the engagement part 44 when operating the pointing stick 28 is dispersed. As a result, it becomes possible to more surely avoid occurrence of such inconvenience that the engagement part 44 is subjected to stress concentration and slips out of the engaged part 42 and falls down.

As illustrated in FIG. 4 and FIG. 5, the pointing stick 28 is supported on the upper face 34a of the bracket member 34 via a sensor substrate 52. The sensor substrate 52 is a control substrate for the pointing stick 28. The pointing stick 28 and the sensor substrate 52 exhibit a module structure that the pointing stick 28 is electrically connected to and fixed to the sensor substrate 52. Load sensors 52a are installed respectively, for example, on the front, the rear, the left and the right of the pointing stick 28 which is located at the center in the planar view. Each load sensor 52a is a sensor which is capable of detecting an operation load which acts on an input operation on the pointing stick 28 in a horizontal direction (front-back, left-right and diagonal directions).

As illustrated in FIG. 3 and FIG. 4, in the bracket member 34, wiring 54 is connected to a trapezoidal front edge which protrudes forward between the attachment holes 40a and 40b. The wiring 54 is a flexible substrate which is used for, for example, control signal transmission and power supply to the sensor substrate 52. The wiring 54 is electrically connected with the pointing stick 28 via the sensor substrate 52 at one end, extends forward along the lower face 32a of the support plate 32 and then is electrically connected with the substrate 22 and so forth at the other end. The wiring 54 is connected to the substrate 22 from, for example, the lower face 32a side of the bulgy part 32c of the support plate 32 and thereby is efficiently wired in the main body chassis 16. That is, in the bracket member 34, owing to installation of the engagement part 44 on the rear edge, it becomes possible to surely arrange the attachment holes 40a and 40b and the engagement part 44 in the space C and smooth connection of the wiring 54 to the bracket member 54 becomes also possible while restricting the outer size of the bracket member 34 to a minimum as illustrated in FIG. 3.

As illustrated in FIG. 5 to FIG. 7B, the support plate 32 has a through-hole 32d at a position where the support plate 32 overlaps with the attachment hole 40a (40b) and has the engaged part 42 at a position where engagement with the engagement part 44 is possible.

As illustrated in FIG. 5, the through-hole 32d passes through the support plate 32 in a plate thickness direction and the cylindrical part 40c of the bracket member 34 is inserted into the through-hole 32d. The base plate 46 has a dish-shaped flange part 46a which is formed so as to bulge upward by drawing and so forth. An upper face 46b of the flange part 46a projects more upward than the upper face 32b of the support plate 32 through a hole which is formed in the membrane sheet 47. A head 38a of the screw 38 abuts on the upper face 46b of the flange part 46a. A threaded part 38b of the screw 38 is screwed into the attachment hole 40a (40b) and a tip of the threaded part 38b is held in the attachment hole 40a (40b). The flange part 46a functions as a fastening part of the screw 38 in this way. Moreover, the flange part 46a also has a function of holding the cylindrical part 40c more firmly in the through-hole 32d.

As described above, the screw 38 is arranged in the space C (C2) between the respective keytops 24 in the planar view (see FIG. 3). Therefore, although the head 38a of the screw 38 is arranged on the upper face 32b of the support plate 32, the head 38a does not interfere with vertical movement of each keytop 24.

Figure 8:
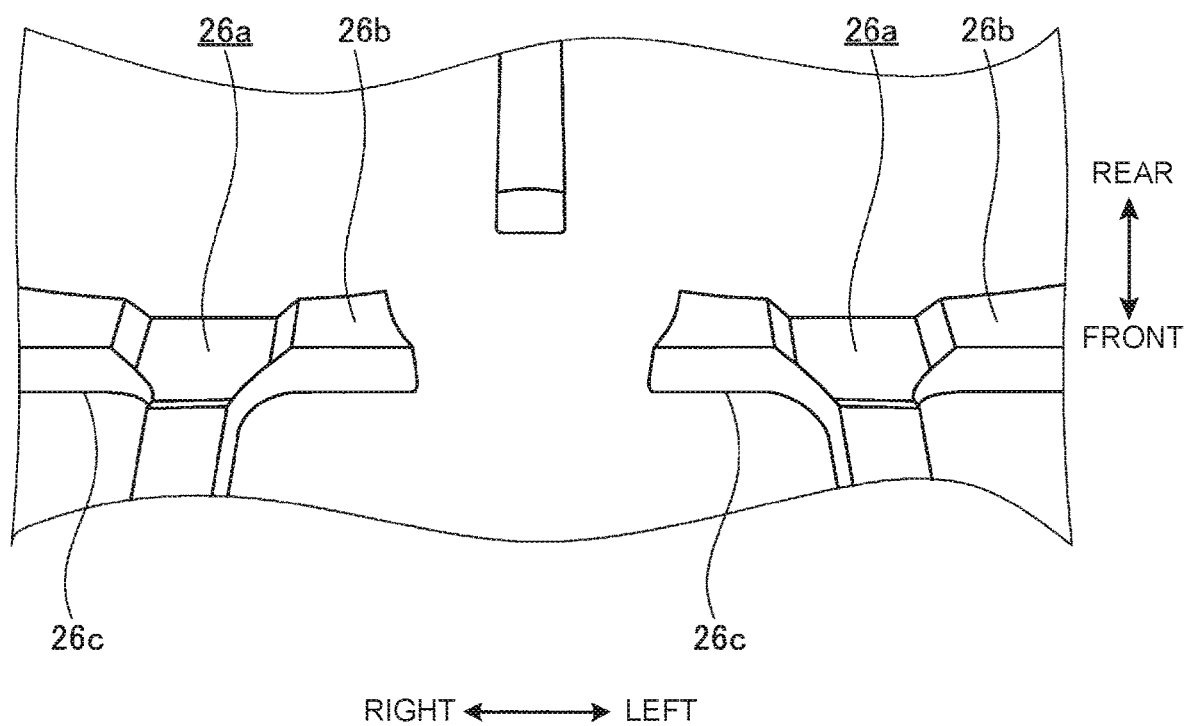
FIG. 8 is a perspective view illustrating run-off parts of a frame and peripheral parts of the run-off parts are viewed from the lower face side of the frame in the enlarged state.

As illustrated in FIG. 5 and FIG. 8, the frame 26 has a run-off part (that is, each of two run-off parts) 26a at a position where the frame 26 overlaps with the screw 38. In principle, a lower face 26b of the frame 26 abuts on the upper face 32b of the support plate 32 and thereby a part of the frame 26 which is arranged in the space C is fastened to the support plate 32 with the attachment screws 36. However, the frame 26 has the run-off part 26a which is formed by denting the lower face 26b toward the upper face 26c side in a part which faces the screw 38 so as to avoid interference between the frame 26 and the head 38a of the screw 38. In the present embodiment, the run-off part 26a is formed as a dented part of such a shape as illustrated in FIG. 5 and FIG. 8. The frame 26 may also have a configuration that a part 26e which is located under a cut line 26d which is indicated by, for example, a two-point chain line in FIG. 5 is cut off. In this configuration, the run-off part 26a has a configuration that a portion on the pointing stick 28 side is made up of an open end and therefore the run-off part 26a does not abut on the upper face 32b of the support frame 32.

As illustrated in FIG. 6 to FIG. 8, the engaged part 42 is an almost L-shaped hook in a side view which is formed by cutting and raising part of the base plate 46 toward the lower face 32 side and bending the cut and raised part forward. The engaged part 42 passes through a hole 48a which is formed in the light guide plate 48 and projects below the lower face 32a of the support plate 32. The engaged part 42 has a backing plate portion 42a which stands downward from the base plate 46 and a pressing plate portion 42b which extends from a lower end of the backing plate portion 42a in a state of bending forward.

In a case of bringing the engagement part 44 into engagement with the engaged part 42, the engagement part 44 is inserted into the engaged part 42 from the front of the engaged part 42. Then, a tip face of the projection 44d of the engagement part 44 bumps against a front face of the backing plate portion 42a of the engaged part 42. Therefore, the bracket member 34 is positioned in the front-rear direction (see FIG. 7A and FIG. 7B). At the same time, the left and right side walls 44c of the engagement dented portion 44b of the engagement part 44, specifically, stepped portions 44e of the side walls 44c at which inclination angles are changed bump against left and right end faces of the backing plate portion 42a of the engaged part 42. Accordingly, the bracket member 34 is positioned also in the left-right direction (see FIG. 7A). On this occasion, a lower face 44f of the engagement part 44 is held by being pressed by the pressing plate portion 42b of the engaged part 42. As a result, the engagement part 44 comes into engagement with the engaged part 42 in a state of being positioned relative to the engaged part 42 in the front-rear direction and in the left-right direction.

As described above, in the electronic apparatus 10 according to the present embodiment, the bracket member 34 which supports the pointing stick 28 is fixed to the lower face 32a side of the support plate 32 by using the screw 38. Then, the head 38a of the screw 38 projects more upward than the upper face 32b of the support plate 32 and is arranged in the space C between the adjacent keytops 24.

The head 38a of the screw 38 is arranged at the position where the head 38a projects more upward than the upper face 32b of the support plate 32 in this way. Thereby, it becomes possible to secure the engagement length which makes sure fixing of the screw 38 into the attachment hole 40a (40b) possible at a position where the tip (a lower end) of the screw 38 does not project downward from the lower face 34b of the bracket member 34. Accordingly, it becomes possible to prevent the tip of the threaded portion 38b from projecting downward from the lower face 34b of the bracket member 34 and interfering with components such as the substrate 22 and so forth which are located under the bracket member 34 and then to thin the main body chassis 16. Moreover, since the screw 38 is also prevented from interfering with the keytops 24, it becomes possible to promote thinning of the whole keyboard device 20 while sufficiently securing the key stroke of the keytops 24. On this occasion, since the attachment hole 40a (40b) has a configuration that a female screw is formed in the upward facing cylindrical part 40c which is formed on the bracket member 34, it is also possible to prevent the attachment hole 40a (40b) from projecting downward from the lower face 34b of the bracket member 34.

Since the electronic apparatus 10 further has the frame 26 which fills the space C between/among the respective keytops 24, it is possible to prevent the head 38a of the screw 38 from exposing to the outside and the outer appearance of high quality is obtained. On this occasion, since the frame 26 has the run-off part 26a at the position where the frame 26 and the head 38a of the screw 38 overlap each other, the frame 26 does not interfere with the screw 38.

In the electronic apparatus 10, the bracket member 34 is attached to the support plate 32 by using the attachment holes 40a, 40b and the engagement part 44. Then, the engagement part 44 is installed at the position which is set as the third vertex T3 of the triangle that the attachment holes 40a and 40b are set as the first vertex T1 and the second vertex T2 respectively and the side which connects the attachment holes 40a and 40b is set as the base. Accordingly, the bracket member 34 is fixed to the support plate 32 in a well-balanced state at the three fixed points and the detection accuracy by the load sensor 52a is improved. Moreover, the work of attaching the bracket member 34 is performed simply by attaching the two screws 38 into the respective attachment holes 40a and 40b, for example, after bringing the engagement part 44 into engagement with the engaged part 42 and therefore is efficiently performed.

On this occasion, the engagement part 44 comes into engagement with the engaged part 42 in a state of being positioned in the front-rear direction and the left-right direction. Thereby, since the bracket member 34 is positioned in the horizontal direction simply by bringing the engagement part 44 into engagement with the engaged part 42 when performing the work of attaching the bracket member 34, efficiency of the attaching work is more improved. In addition, it becomes also possible to prevent positional displacement of the engagement part 44 which is caused by application of the load when operating the pointing stick 28.

In the electronic apparatus 10, the pointing stick 28 is arranged in an inner region of the triangle T in the planar view at a position where the pointing stick 28 overlaps with the perpendicular line P which runs perpendicularly to the base, passing through the third vertex T3 at which the engagement part 44 is located. Thereby, the pointing stick 28 is arranged in a state of almost matching the center of gravity of the bracket member 34 of the triangular shape which is made up of the attachment holes 40a and 40b and the engagement part 44. Accordingly, since the load which is generated when operating the pointing stick 28 is equally applied to the bracket member 34, the accuracy of detecting the operation of the pointing stick 28 by the load sensor 52a is improved.

Figure 9:
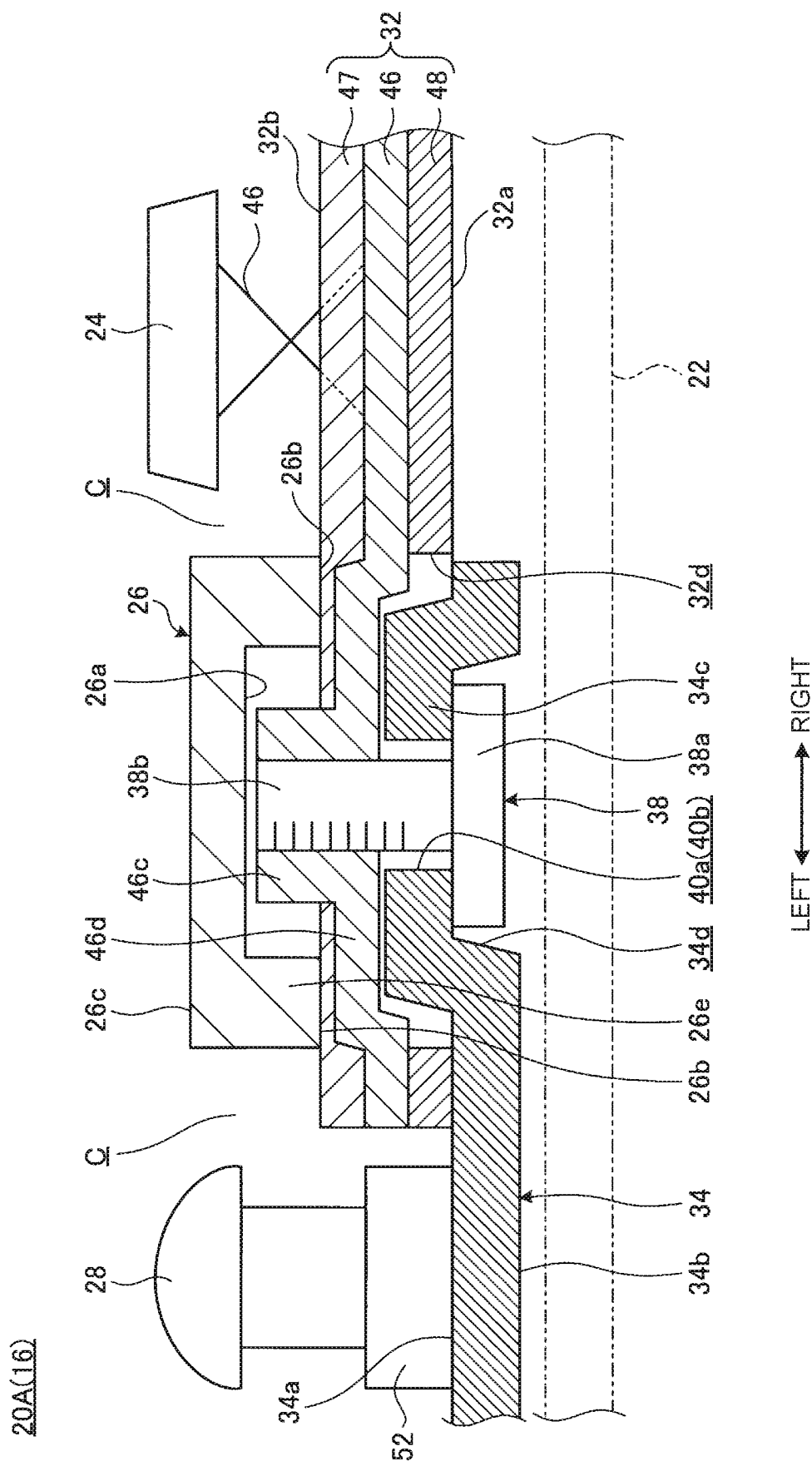
FIG. 9 is an enlarged sectional diagram illustrating a longitudinal section structure of a keyboard device, according to a modified example.

FIG. 9 is an essential part enlarged sectional diagram schematically illustrating one example of a longitudinal section structure of a keyboard device 20A according to a modified example.

In the keyboard device 20A which is illustrated in FIG. 9, a direction that the screw 38 is fastened is vertically reversed and the female screw with which the screw 38 is to be screwed is formed not in the attachment hole 40a (40b) of the bracket member 34 but in the base plate 46 in comparison with the keyboard device 20 which is illustrated in FIG. 5.

A dish-shaped flange part 34c which is bulged upward by drawing and so forth is formed on the bracket member 34 of the keyboard device 20A and the attachment hole 40a (40b) is formed in the flange part 34c. The flange part 34c forms a circular dented part 34d on the lower face 34b side of the bracket member 34. The head 38a of the screw 38 is housed in the dented part 34d and abuts on a lower face of the flange part 34c.

A cylindrical part 46c which is formed by performing burring processing from the lower face 32a side to the upper face 32b side and stands upward from the upper face 32b is formed on the base plate 46 of the keyboard device 20A. The through-hole 32d is formed to pass through the cylindrical part 46c. The female screw into which the screw 38 is to be screwed is formed in an inner circumferential face of the cylindrical part 46c. In a configuration example illustrated in FIG. 9, in the base plate 46, the cylindrical part 46c is installed on the center of a flange part 46d which is bulged upward in order to avoid contact with the flange part 34c of the bracket member 34. The flange part 46d may be omitted depending on the shape and so forth of the flange part 34c. The threaded part 38b of the screw 38 is screwed into the cylindrical part 46c and a tip of the threaded part 38b is held in the cylindrical part 46c.

The screw 38 of the keyboard device 20A is arranged at the position where the tip of the threaded part 38b projects more upward than the upper face 32b of the support plate 32 in this way. Thereby, it becomes possible for the screw 38 to secure the engagement length which makes sure fixing into the attachment hole 40a (40b) possible at the position where the head 38a (the lower end) of the screw 38 does not project downward from the lower face 34b of the bracket member 34. Accordingly, it becomes possible to prevent the head 38a of the screw 38 from projecting downward from the lower face 34b of the bracket 34 and interfering with the substrate 22 and so forth which are installed under the bracket member 34 and to thin the main body chassis 16. On this occasion, since the head 38a of the screw 38 is housed in the dented part 34d of the bracket member 34, it becomes possible to more surely prevent the head 38a of the screw 38 from projecting downward from the lower face 34b of the bracket member 34. Moreover, since the screw 38 is also prevented from interfering with the keytops 24, it becomes possible to promote thinning of the whole keyboard device 20 while sufficiently securing the key stroke of the keytops 24.

Incidentally, in the keyboard device 20 which is illustrated in FIG. 5, since it is not necessary to form a screw hole into which the screw 38 is to be screwed in the base plate 46, it becomes possible to more thin the base plate 46 than the base plate 46 of the keyboard device 20A which is illustrated in FIG. 9 and consequently thinning of the whole electronic apparatus 1 becomes possible. That is, it is preferable to configure the base plate 46 by a metal plate which is at least, for example, 0.3 mm in plate thickness in order to form the cylindrical part 46c which has the female screw therein as illustrated in FIG. 9. On the other hand, in a case where the cylindrical part 40c which has the female screw therein is formed on the bracket member 34 as illustrated in FIG. 5, it becomes possible to configure the base plate 46 by a metal plate which is, for example, not more than 0.2 mm in plate thickness. However, in the keyboard device 20A which is illustrated in FIG. 9, when attaching the bracket member 34, since it is possible to fasten the screw 38 from the lower face 32a side as it is after bringing the engagement part 44 into engagement with the engaged part 42 on the lower face 32a side of the support plate 32, there is such an advantage that assembly operation efficiency is high.

As has been described, the present invention provides an improved electronic apparatus having a thin keyboard device that is equipped with a pointing stick.

While the invention has been particularly shown and described with reference to a preferred embodiment, it will be understood by those skilled in the art that various changes in form and detail may be made therein without departing from the spirit and scope of the invention.

What is claimed is:

1. An electronic apparatus, comprising:
a keyboard having a support plate;
a plurality of keytops located on an upper face side of said support plate;
a pointing stick, located on said upper face side of said support plate, is surrounded by said plurality of keytops;
a bracket member having a pair of attachment holes, located on a lower face side of said support plate, supports said pointing stick, wherein said bracket member includes an engagement part for engaging with an engaged part formed in said support plate, wherein said pair of attachment holes is located more forward than said engagement part; and
a pair of screws, each located in a space between said plurality of keytops without encroaching on a footprint of any of said keytops, secures said bracket member to said support plat.

2. The electronic apparatus of claim 1, wherein said bracket member includes a stress dispersion structure part for dispersing a stress being applied to said engagement part during operations of said pointing stick by reducing the strength of a position located closer to said engagement part than to said pair of attachment holes.

3. The electronic apparatus of claim 1, further comprising a frame for partitioning off said respective keytops by being arranged so as to fill the space between said respective keytops and to be installed in such a manner that a lower face of said frame abuts on said upper face of said support plate.

4. The electronic apparatus of claim 3, wherein said frame includes a run-off part formed by denting part of said lower face of said frame towards said upper face side at a location where said frame and said tip of said screw overlap each other.

5. An electronic apparatus, comprising:
a keyboard having a support plate;
a plurality of keytops located on an upper face side of said support plate;
a pointing stick, located on said upper face side of said support plate, is surrounded by said plurality of keytops;
a pair of screws, arranged in a space between said plurality of keytops, secures said bracket member to said support plate, wherein a tip of said screw projects more upward than said upper face of said support plate; and a bracket member, located on a lower face side of said support plate, supports said pointing stick, wherein said bracket member includes a pair of attachment holes into which said pair of screws are attached, and an engagement part that comes into engagement with an engaged part formed in said support plate, wherein said bracket member includes a stress dispersion structure part that disperses a stress applied to said engagement part in operation of said pointing stick by reducing strength of a position located closer to said engagement part than to said attachment holes.

6. The electronic apparatus of claim 5, wherein said engagement part is installed at a position that is set as a third vertex of a triangle that said pair of said attachment holes is set as a first vertex and a second vertex, respectively, and a side that connects said one pair of attachment holes is set as a base.

7. The electronic apparatus of claim 6, wherein in said triangle, at least a length of a side that connects said first vertex and the third vertex and a length of a side which connects the second vertex and said third vertex are the same as each other.

8. The electronic apparatus of claim 7, wherein said pointing stick is arranged in an inner region of said triangle in a planar view and at a position where said pointing stick overlaps with a perpendicular line that runs perpendicularly to said base, passing through said third vertex.

9. The electronic apparatus of claim 5, wherein said engagement part comes into engagement with said engaged part in a state of being positioned in a front-rear direction and a left-right direction.

10. The electronic apparatus of claim 5, wherein said bracket member is arranged at a position where said pair of attachment holes is located more forward than said engagement part.

11. The electronic apparatus of claim 10, wherein wiring is electrically connected to said pointing stick to a front edge of said bracket member.

* * * * *